US006210526B1

(12) United States Patent
Pohlen

(10) Patent No.: US 6,210,526 B1
(45) Date of Patent: Apr. 3, 2001

(54) METHOD FOR ELIMINATING STICKIES FROM TREATMENT OF WASTE PAPER USING HYDROPHOBIZED MINERALS

(75) Inventor: Alfred Pohlen, Luxembourg (BE)

(73) Assignees: Gerhard Kern, Neudorfl; part interest; Heinz Dullinger, Ebenau, both of (AT); part interest ( * ) Notice: Subject to any disclaimer, the term of this patent is extended or adjusted under 35 U.S.C. 154(b) by 0 days.

(21) Appl. No.: 09/382,129

(22) Filed: Aug. 24, 1999

(30) Foreign Application Priority Data

Sep. 22, 1998 (EP) .................................................. 98630053

(51) Int. Cl.⁷ .................................. D21B 1/08; D21B 1/06
(52) U.S. Cl. .................................... 162/4; 162/8; 162/199; 162/DIG. 4
(58) Field of Search ........................... 162/4, 5, 8, 181.8, 162/181.1, 199, DIG. 4

(56) References Cited

U.S. PATENT DOCUMENTS 5,389,200 * 2/1995 Cody et al. ............................ 162/5

* cited by examiner

*Primary Examiner*—Dean T. Nguyen
(74) *Attorney, Agent, or Firm*—Thomas S. Baker, Jr.

(57) ABSTRACT

The invention relates to a method for inhibiting and eliminating adhesive impurities, so-called stickies, from waste paper preparations or paper pulp containing prepared waste paper in the paper industry by using classic sorting- and dispersion equipment and a flotation unit consisting of one or more flotation stages containing deinking froth. In the course of preparing the waste paper for making a paper pulp which is fed to a paper machine, a hydrophobized synthetic or natural mineral is added to the pulp before or during its introduction into the paper machine, causing the microstickies to be adsorbed by the added hydrophobized mineral and removed by same from the flotation unit via the deinking froth.

9 Claims, No Drawings

METHOD FOR ELIMINATING STICKIES FROM TREATMENT OF WASTE PAPER USING HYDROPHOBIZED MINERALS

CROSS-REFERENCES

None.

FIELD OF THE INVENTION

The invention relates to a method for eliminating adhesive impurities, i.e. so-called stickies, from paper pulp during the treatment process of waste paper in the paper industry, which process comprises not only grading equipment which grades by size (screening), shape (screening), and density (cleaner, centricleaner, etc.) as well as dispersing equipment and the like, but also one- or multistage flotation units, in which printing ink and dirt particles are to be eliminated via the deinking froth.

BACKGROUND OF THE INVENTION

In the manufacture of paper from waste paper, the introduction of waste paper results in the presence of tacky impurities called stickies. The term "stickies" covers, among others, resin, dispersions for higher-value end products, hot melts for backings and also print ink binding agents as the most important material groups. Stickies, in other words adhesive impurities, represent a significant stumbling block in waste paper processing and especially affect the runnability of the paper machine and the quality of the end product. Stickies are essentially divided into micro- and macrostickies, with the dividing line arbitrarily set at 150 microns, since only above this size is it possible to mechanically separate out the sticks. The reduction in size of the slot widths of the sorting baskets down to 150 microns, which has been pursued over the past years, resulted in a significantly improved separation of macrostickies. Total elimination of macrostickies has not been achieved, however, despite these technologies. This proves that microstickies, present in the cycles, agglomerate into larger units, in other words macrostickies, after the macrostickies have been separated out, due to the constant fluctuations of pressure, temperature and ph as well as mechanical effects. According to the current state of the art in sorting, the elimination of microstickies in waste paper processing has the greatest potential in the fight against stickies.

In order to overcome the microstickie problem, the following techniques were suggested:

Fixing the anionic part of the microstickies to the paper fiber by means of a highly cationic, synthetic liquid substance (Poly-DADMAC, PAC, polyamine, etc.) and removal from the paper machine cycle. This technique barely reduces deposits in the dry section of the paper machine or the deposits on the calender rolls. There is also a potential negative interaction with other paper auxiliaries (coacervation). The problem itself is recycled with the next waste paper cycle, since the stickies remain in the end product.

Adsorption without removal: Dosing of minerals in the area of the paper machine. This is intended to sheathe or "de-stick", in short inhibit, macrostickies in the paper machine cycle. However, it increases the amount of fillers in the end product which, in turn, adversely affect the strength properties and optical properties of the manufactured paper. Here, too, the problem is recycled with the next waste paper cycle, since the inhibited stickies remain in the end product.

Addition of polymers with one hydrophobic and one cationic end each: These products are added in liquid form tot he primary cycle of the paper machine itself. In practice, this has had no effect on the dry section or the calender rolls, i.e. the deposits in the dry section or on the calender rolls hardly diminished. Here, too, the problem is recycled with the next waste paper cycle, since the stickies remain in the end product.

All these recommendations merely gloss over the real problem of the presence of stickies. This also shows that there is a need for action for solving the problems caused by stickies, especially microstickies, remaining in the paper pulp.

The goal of the invention is to create a method, based on the described state of the art, to eliminate the problems caused by stickies, especially microstickies.

SUMMARY OF THE INVENTION

With this method, which is the object of the invention, this task is solved by the fact that, during the preparation of the waste paper for making paper pulp, which is fed into a paper machine, a hydrophobized synthetic or natural mineral is added to the paper pulp before or during the introduction of the pulp into the flotation unit, with the microstickies being adsorbed by the added hydrophobized mineral and being removed by same via the deinking froth from the flotation unit.

DRAWINGS

None.

DETAILED DESCRIPTION

In order to reduce the problem of microstickies to a really noticeable degree, the invention makes use of a synthetic or natural mineral (zeolite, $CaCO_3$, etc.) which, due to additional treatment, takes on a strongly hydrophobic character. The additional treatment is not part of the invention, but the hydrophobic character of the mineral after the additional treatment must be so pronounced that a dispersion of the product in clear water or in classic alkaline or neutral deinking formulations without paper pulp is completely impossible. Such a product is then added—at a rate of 0.5 kg to 25 kg per ton of waste paper—to the prepared waste paper in the course of making paper pulp, upstream from the flotation unit. Microstickies are adsorbed and removed together with the product via the deinking froth from the flotation unit. The inhibition of stickies known as a result of the addition of such products after flotation, or before the paper machine cycle, also takes place in the flotation unit as a secondary effect. This effect could be proven for the first time with the help of images from a scanning electron microscope of stickies of a processed pulp.

The working mechanism of these products in the flotation cells is primarily related to their highly hydrophobic character which causes the individual particles in an aqueous medium to want to make contact with other hydrophobic substances such as stickies, among others. The strongly hydrophobic character of these products guarantees that their hydrophobic particles loaded with microstickies attach themselves to air bubbles and are transported to the surface.

Contrary to previous techniques, where classic minerals (bentonite, talc, etc.) were used for the sole purpose of inhibiting (not eliminating) micro- and macrostickies, here an additionally hydrophobized substance is added during or before the flotation process in order to eliminate (not inhibit) the microstickies via the deinking sludge and to inhibit the stickies remaining in the pulp, i.e. the stickies that were not sorted out. In other words, the flotation cell itself is used effectively for the first time to remove microstickies and to inhibit remaining macrostickies. These events were metrologically proven with absolute certainty.

The hydrophobized synthetic or natural minerals can be added in the form of a fiber-containing slurry or powder.

It is also possible to add hydrophobized synthetic or natural minerals in powder form to the paper pulp coming from the flotation unit in order to inhibit by adsorption the remaining micro- or macrostickies.

The fact that the mentioned microstickies are not inhibited or fixed, but removed, yields the following advantages:

Removing adhesive impurities upstream from the paper machine has an effect not only in the wet section of the paper machine, but also in the dry section and the subsequent calender rolls. This effect is decidedly stronger than when using inorganic inhibiting agents.

Since the products are removed from the waste paper raw material in the flotation unit together with the stickies, an effect of the products themselves on paper quality is not possible.

Sticky detrimental substances are almost completely eliminated from the waste paper cycle. When a sufficiently large number of paper companies use these products, it does not lead to a concentration of adhesive impurities in waste paper raw material, as is the case now, but to a reduction in these impurities.

All other previously used and only partially functioning product groups (fixing, inhibiting) can be eliminated unless they also serve other purposes.

According to the method, which is the object of this invention, the hydrophobized product is added to the prepared waste paper (in the waste paper pulper, for instance) in premeasured sacks or by means of Big Bag and metering screw.

The highly pronounced effect of a hydrophobized mineral with regard to the elimination of microstickies in the flotation unit and the inhibition of macrostickies was unambiguously proven in two test trials:

EXAMPLE 1

Metrological Proof of the Working Mechanism

Newspaper manufacturing with 80%–90% of deinked waste paper
Plant configuration:
50% newspaper, 50% waste paper
Chemicals: lye, peroxide, water glass (sodium silicate), modified fatty acid;
Low-consistency pulper (4,500 kg waste paper capacity);
Voith paddle cells parallel to Voith injector cells
Testing method:
Dosing location: waste paper pulper (always upstream from the flotation cells)
Dosing quantity: 15 kg/pulper=0.33% in relation to waste paper feed
Duration of test: approximately 24 h
Measurements regarding microstickies using the Escher Wyss method:
After course sorting, after preflotation, after postflotation and in the finished product
Results in regard to microstickies:
Surface of the microstickies without and with hydrophobized mineral (determination through flocculation)

| Sample | without hyd. mineral $m^2/m^2$ | with hyd. mineral $m^2/m^2$ |
| --- | --- | --- |
| after course sorting | 1,169.49 | 12.85 |
| after flotation | 67.33 | 4.71 |
| after postflotation | 15.69 | 0.00 |
| finished product | 14.79 | 0.00 |

No microstickies could be detected in the paper pulp—neither in the finished product, nor as early as after postflotation.

After course sorting, product agglomeration with macrostickies could, for the first time, be documented via scanning electron microscope images.

EXAMPLE 2

Proof of the Efficiency of the Elimination of Microstickies

Manufacture of offset printing paper, typewriter and printer paper, envelope paper, poster paper, chlorine-free recycled paper from 100% waste paper;
Waste paper use of between 30% and 100%, usually between 60% and 70%
Plant configuration:
Raw material: Print shop and office waste, which are estimated to contain between 0.3% and 0.4% of adhesive material;
Chemicals: Lye, modified fatty acid, no silicate, no peroxide;
Machines: Medium-consistency pulper (11% to 13%)
Swelling time: approximately 40 minutes; 3-stage flotation unit with injector cells from Lamort and Escher Wyss;
Sorting: 150 microns;
Hot dispersion.
Test method:
Dosing location: waste paper pulper (always upstream from the flotation cells)
Dosing quantity: 2.3% of an inorganic classic stickie-inhibitor was replaced with 0.4% of the hydrophobized mineral
Duration of the test: 1 month
Results The wet screen, the first lower dry screen, as well as the calender rolls of the paper machine remained almost deposit-free, even under occasional intentional high stickie load. The condition of the wet and dry screens and that of the calender rolls is, of course, the result of the elimination of microstickies.

The almost total absence of macrostickies in the paper machine (apparently again agglomerated microstickies) is emphasized.

Starting with a machine downtime of 20 h/month (usually high), in the end a downtime of 0.99 h/month (usually low) could be achieved. The average downtime until now was approximately 5 h/month.

I claim as my invention:

1. Method for eliminating or inhibiting adhesive impurities comprising microstickies and macrostickies, from paper pulp during the preparation process of waste paper in the paper industry, which process treating the waste paper, uses grading equipment which grades by size, shape and density, dispersing equipment, and one-or multistage floatation units in which print ink and dirt particles are to be eliminated via a deinking froth, comprising the steps of adding, a hydrophobized synthetic or natural mineral being sufficiently hydrophobic as to preclude the dispersion of the hydrophobized synthetic or natural mineral in clear water or in an alkaline or neutral fiber-free deinking formulation to the treated paper pulp before or during the introduction of the treated paper pulp into the flotation unit, to cause the microstickies to be absorbed by the added hydrophobized mineral and removed thereby from the flotation unit via the deinking froth, wherein the treated paper pulp is fed to a paper machine.

2. Method according to claim 1, wherein the hydrophobized synthetic or natural mineral is added in the form of a fiber-containing slurry.

3. Method according to claim 2, characterized by the additional step of adding the hydrophobized synthetic or natural mineral in powder form to the paper pulp coming from the flotation unit in order to inhibit by adsorption any remaining micro- and macrostickies.

4. Method according to claim 2, characterized by the additional step of adding a hydrophobized synthetic or natural mineral in the form of a fiber-containing slurry to the paper pulp coming from the flotation unit in order to inhibit by adsorption any remaining micro- and macrostickies.

5. Method according to claim 1, wherein the hydrophobized synthetic or natural mineral is added in powder form.

6. Method according to claim 5 characterized by the additional step of adding a hydrophobized synthetic or natural mineral in powder form to the paper pulp coming from the flotation unit in order to inhibit by adsorption any remaining micro- and macrostickies.

7. Method according to claim 5, characterized by the additional step of adding a hydrophobized synthetic or natural mineral in the form of a fiber-containing slurry to the paper pulp coming from the flotation unit in order to inhibit by adsorption any remaining micro- and macrostickies.

8. Method according to claim 1, characterized by the additional step of adding a hydrophobized synthetic or natural mineral in powder form to the paper pulp coming from the flotation unit in order to inhibit by adsorption any remaining micro- and macrostickies.

9. Method according to claim 1, characterized by the additional step of adding a hydrophobized synthetic or natural mineral in the form of a fiber-containing slurry to the paper pulp coming from the flotation unit in order to inhibit by adsorption any remaining micro- and macrostickies.

* * * * *